US012767193B2

(12) United States Patent
Mianzo et al.

(10) Patent No.: US 12,767,193 B2
(45) Date of Patent: Oct. 20, 2026

(54) RAILWAY DEFECT FALSE ALARM MITIGATION BY MULTIPLE TRACK CONFIGURATION ANALYSIS

(71) Applicant: Caterpillar Inc., Peoria, IL (US)

(72) Inventors: Lawrence A. Mianzo, Pittsburgh, PA (US); Mike Hoffelder, Norwich, NY (US); Tod A. Oblak, Pittsburgh, PA (US); Marc D. Miller, Lee's Summit, MO (US); Darrell D. Cantrell, Bonner Springs, KS (US)

(73) Assignee: Caterpillar Inc., Peoria, IL (US)

( * ) Notice: Subject to any disclaimer, the term of this patent is extended or adjusted under 35 U.S.C. 154(b) by 407 days.

(21) Appl. No.: 18/589,446

(22) Filed: Feb. 28, 2024

(65) Prior Publication Data

US 2025/0269884 A1 Aug. 28, 2025

(51) Int. Cl.

| | |
|---|---|
| ***B61L 23/04*** | (2006.01) |
| ***B61L 27/60*** | (2022.01) |
| ***G06T 7/00*** | (2017.01) |
| ***G06T 7/33*** | (2017.01) |
| ***G06T 7/73*** | (2017.01) |
| ***G06V 10/44*** | (2022.01) |

(Continued)

(52) U.S. Cl.

CPC ............... *B61L 23/04* (2013.01); *B61L 27/60* (2022.01); *G06T 7/0002* (2013.01); *G06T 7/33* (2017.01); *G06T 7/73* (2017.01); *G06V 10/44* (2022.01); *G06V 10/774* (2022.01); *G06V 10/945* (2022.01); *G06V 20/56* (2022.01); *G06V 20/70* (2022.01); *G06T 2207/20081* (2013.01); *G06T 2207/30252* (2013.01)

(58) Field of Classification Search

CPC . B61L 23/04; B61L 27/60; G06T 7/73; G06T 7/33; G06T 7/0002; G06V 20/70; G06V 10/44; G06V 10/774; G06V 20/56; G06V 10/945

USPC ...................................................... 246/473 R

See application file for complete search history.

(56) References Cited

U.S. PATENT DOCUMENTS 8,231,270 B2 * 7/2012 Groeneweg ............. B61L 27/53
701/19
8,724,904 B2 5/2014 Fujiki et al.

(Continued)

FOREIGN PATENT DOCUMENTS

CN 102854191 B 9/2014
CN 106251361 B 1/2019

(Continued)

*Primary Examiner* — Troy Chambers

(57) ABSTRACT

A track defect false alarm mitigation apparatus for a rail vehicle that is conveyed on a railway includes a processor onboard the rail vehicle that is constructed to perform feature detection on a track image captured from the railway to label an attribute in the track image as a feature of the railway captured in the track image. Model parameters for a track detection model are accepted from another processor. A track detection model is executed using the model parameters provided thereto to generate a track configuration context that predicts the locations of track configuration components. An attempt is made to register the feature and the track configuration context one with the other. The issuance of an alert of a track defect is excluded except in response to the feature registering with the track configuration context to a confidence level.

20 Claims, 8 Drawing Sheets

(51) Int. Cl.

| | |
|---|---|
| ***G06V 10/774*** | (2022.01) |
| ***G06V 10/94*** | (2022.01) |
| ***G06V 20/56*** | (2022.01) |
| ***G06V 20/70*** | (2022.01) |

(56) References Cited

U.S. PATENT DOCUMENTS

| | | | | |
|---|---|---|---|---|
| 8,942,426 | B2 | 1/2015 | Bar-Am | |
| 10,752,271 | B2 | 8/2020 | Chung et al. | |
| 11,468,551 | B1 | 10/2022 | Amouie et al. | |
| 12,479,482 | B2 * | 11/2025 | Liu | B61L 23/041 |
| 2021/0078622 | A1 | 3/2021 | Miller et al. | |
| 2023/0087606 | A1 * | 3/2023 | Jovenall | B61L 15/0062 246/122 R |
| 2023/0159070 | A1 * | 5/2023 | Heo | B61L 23/041 246/121 |

FOREIGN PATENT DOCUMENTS

| | | | | |
|---|---|---|---|---|
| CN | 114332174 | A * | 4/2022 | |
| EP | 4059805 | A2 * | 9/2022 | B61L 23/041 |
| JP | 11202003850 | U * | 5/2020 | |
| WO | WO-2022087506 | A1 * | 4/2022 | H04N 23/56 |

* cited by examiner

RAILWAY DEFECT FALSE ALARM MITIGATION BY MULTIPLE TRACK CONFIGURATION ANALYSIS

TECHNICAL FIELD

Generally, the present disclosure relates to false alarm mitigation for rail vehicles such as railway rail vehicles. More specifically, the subject matter disclosed herein is directed to railway track defect false alarm mitigation using multiple track configuration analysis techniques including computer vision (CV) and artificial intelligence (AI).

BACKGROUND

Railway track defects pose not only a hazard to rail vehicles, but also to persons aboard and surrounding the rail vehicle. Accordingly, railway operators deploy different systems and methods to detect such track defects as track buckles and other track deformation that permit a rail vehicle other than constrained travel thus increasing the likelihood of an accident.

US Patent Application Publication 2021/0078622 is directed to a system for detecting buckled rail in a railroad track. A forward-facing camera is mounted on a locomotive of a rail vehicle traveling on the railroad track. The forward-facing camera may be configured to capture images of the rails ahead of the locomotive, to detect a buckled rail in the images, and to measure dimensions of the buckled rail. Additionally, an event recorder onboard the locomotive is in communication with the forward-facing camera to receive data therefrom that are associated with the buckled rail when the forward-facing camera detects the buckled rail. The data may include images of the buckled rail and the dimensions of the buckled rail. The event recorder may be further configured to transmit an alarm signal to a display interface of a remote unit if the dimensions of the buckled rail meet a predetermined threshold.

While existing systems such as those described above offer improved defect detection than ever before, the number of false alarms can become a burden on the operator in that each alarm, whether false or not, must be attended to. Accordingly, research and engineering resources are being devoted to mitigating false alarms to minimize operator tedium.

SUMMARY

In one aspect of the present inventive concept, a track defect false alarm mitigation apparatus for a rail vehicle that is conveyed on a railway includes a processor onboard the rail vehicle that is constructed to perform feature detection on a track image captured from the railway to label an attribute in the track image as a feature of the railway captured in the track image. Model parameters for a track detection model are accepted from another processor. A track configuration context, as defined below, is generated by the track detection model using model parameters provided thereto by the other processor. The track configuration context predicts the locations of track configuration components. An attempt is made to register the feature and the track configuration context on the the other. An alert of a track defect may be issued except in response to the feature and the track configuration context aligning to a confidence level.

In another aspect of the present inventive concept, a railway enterprise system of rail vehicles having an onboard processor onboard each of the rail vehicles and an offboard processor physically removed from and communicatively coupled to the onboard processor. Each of the onboard processors accepting a track image captured from the railway by an imaging device. Model parameters for a track detection model are accepted from another processor. Feature detection is performed on the track image to label an attribute in the track image as a feature of the railway captured in the track image. A track configuration context is generated using model parameters provided thereto. The track configuration context predicts locations of track configuration components based on the track image. An attempt is made to register the feature with the predicted track configuration components based on the track image. An alert is issued except in response to the feature registering with the track configuration to a confidence level. The offboard processor is constructed to train the offboard track detection model on the pixels representing the known track configurations to meet a cost threshold and to convey parameters of the trained offboard track detection model to the onboard processor as the parameters of the track detection model accepted thereat.

In yet another aspect of the present inventive concept, a track defect false alarm mitigation method for a rail vehicle that is conveyed on a railway includes performing, at a processor onboard the rail vehicle, feature detection on a track image captured from the railway to label an attribute therein as a feature of the railway. The processor onboard the rail vehicle accepts model parameters for a track detection model from another processor. A track configuration context is generated by artificial intelligence using the track detection model configured with the model parameters provided thereto by the other processor. The processor onboard the rail vehicle attempts to register the feature with the track configuration context. An alert of a track defect is issued except in response to the feature registering with the track configuration context to a confidence level.

DESCRIPTION OF EXAMPLE EMBODIMENTS

Figure 1:
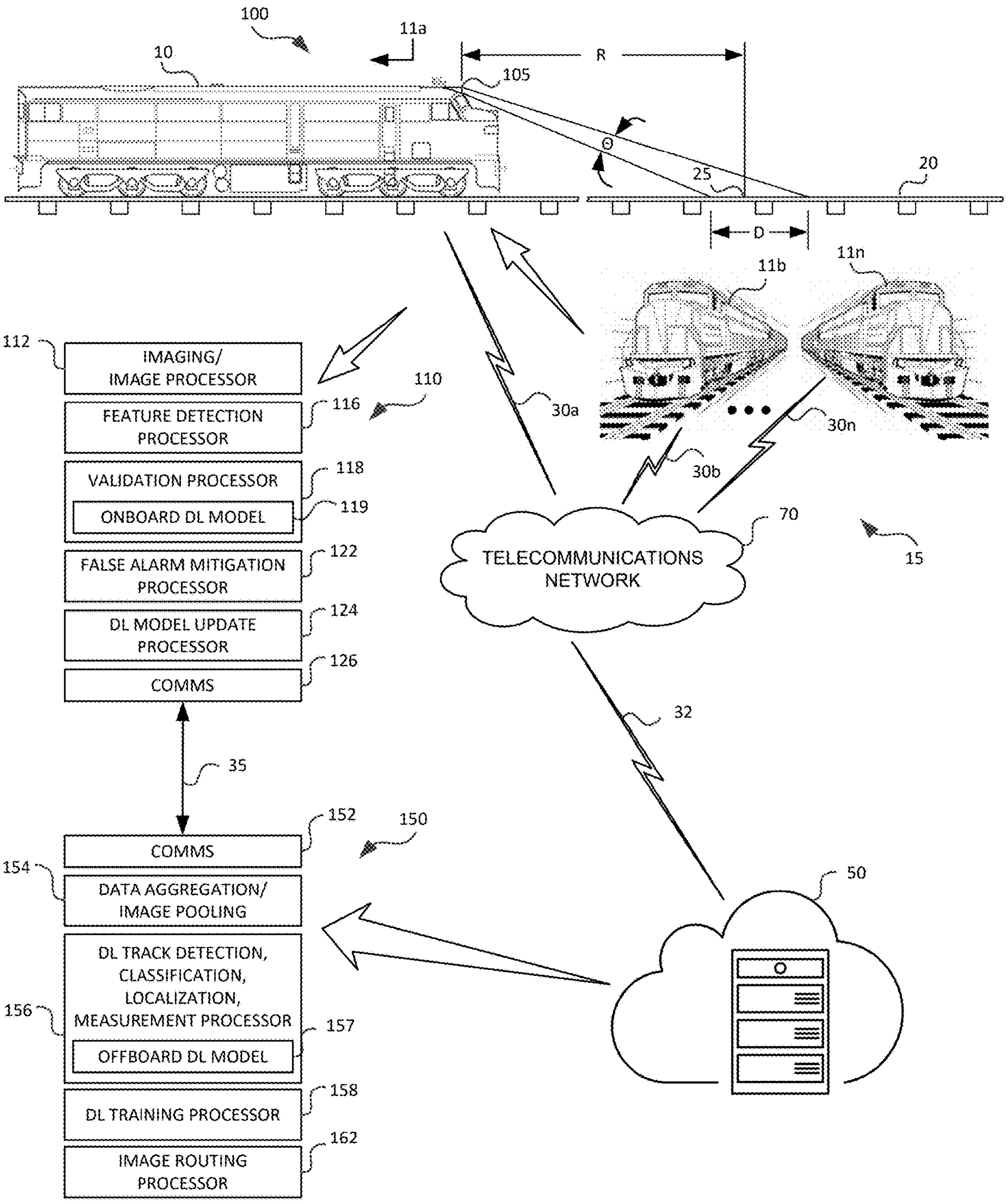
FIG. 1 is a schematic block diagram of an exemplary rail system on which rail vehicles are conveyed in an embodiment of the present inventive concept.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments.

The figures described herein include schematic block diagrams illustrating various interoperating functional modules. Such diagrams are not intended to serve as electrical schematics and interconnections illustrated are intended to depict signal flow, various interoperations between functional components and/or processes and are not necessarily direct electrical connections between such components. Moreover, the functionality illustrated and described via separate components need not be distributed as shown, and the discrete blocks in the diagrams are not necessarily intended to depict discrete electrical components.

The techniques described herein are directed to false alarm mitigation of railway defects. Upon review of this disclosure and appreciation of the concepts disclosed herein, the ordinarily skilled artisan will recognize other false alarm mitigation contexts in which the present inventive concept can be applied. The scope of the present invention is intended to encompass all such alternative implementations.

As used herein, an "attribute" in an image is intended to refer to a "quantifiable characteristic of a phenomenon present in the image over a set of pixels." A "feature," as the term is used herein, is "an attribute (as defined above) associated with a label in memory circuitry," and "label" is intended to mean "computer-readable data (e.g., metadata), including those descriptive of the feature (e.g., feature name), that is conditionally produced by a subject matter expert (SME) and/or computer-executable deep learning process that has been trained on the quantifiable characteristic being the feature and that has had the image data provided as input thereto." Appropriately, when used as a verb, "label" is intended to mean, "associating, in the memory circuitry, the descriptive data of the feature with the quantifiable characteristic of the phenomenon present in the image." A "track configuration context" is intended to refer to a data set that indicates placement of the railway components predicted by an artificial intelligence model based on the track image under scrutiny. It is to be understood that these designations are not intended to substitute for the ordinary and customary meanings thereof as used in the artificial intelligence arts and, indeed, are intended to be substantially consistent therewith.

FIG. 1 is a schematic block diagram of an exemplary enterprise 100 that operates a fleet 15 of rail vehicles 11*a*-11*n*, representatively referred to herein as rail vehicle(s) 11, each under the power of a locomotive 10, although practicing the present inventive concept is not limited to such. Operational control over a fleet management infrastructure 50 may also fall under the purview of enterprise 100, while railway 20 may be the responsibility of a third party. It is to be understood, however, that the present inventive concept is applicable to other machines that ride on rails and similarly constrained pathways without departing from the spirit and intended scope of the present inventive concept.

Certain railway defects, e.g., track buckling, may be identified through computer-readable images such as those captured by exemplary camera 105. Camera 105 may be constructed or otherwise configured to generate digital images from captured image fields 25 of railway 20. Each image field 25 may be bounded by an image capture diameter D that is defined by the camera optical aperture angle θ. It is to be understood, however, that image field 25 may not necessarily circular, but may be elliptical with the major axis aligned parallel to railway 20. Camera 105 may be mounted on locomotive 10 to position image field 25 downrange by a distance R as it is being conveyed along railway 20 with locomotive 10. As an example, the field of view may capture the nose of locomotive 10 and a region of track around 33° downrange of locomotive 10. In cases where locomotive 10 is not the leading car of the rail vehicle, camera 105 may be mounted on that leading car. However, it is to be understood that camera 105 may be installed anywhere on rail vehicle 11 but is preferably mounted to ensure an unobstructed view of the relevant portions of railway 20. The distance R may be selected according to a combined response time of the machine operator and the digital processing time of track feature detection, classification, localization, measurement, presentation, etc., when rail vehicle velocities are considered.

As illustrated in FIG. 1, each rail vehicle 11 in fleet 15 may be outfitted with an onboard processor 110 that is communicatively coupled to an offboard processor 150 through a communications channel 35. Communications channel 35 may be constructed from, for example, a corresponding communications link 30*a*-30*n* and a communications link 32 coupled one to another according to signaling interfaces and data transfer protocols of a telecommunications network 70. To implement such coupling, onboard processor 110 and offboard processor 150 may include communications components 126 and 152, respectively, that are each constructed or otherwise configured to synchronize, modulate/demodulate, code/decode, etc., radio signals conveying data on communication channel 35. The present inventive concept may be embodied in various signal interfaces, data transfer protocols, etc., known to skilled artisans without departing from the spirit and intended scope thereof.

Onboard processor 110 may be constructed or otherwise configured with computer readable instructions and/or electronic processing and memory circuitry to perform various functions, each depicted in FIG. 1 as a distinct processor component solely for purposes of explanation. As will be discussed further below, offboard processor 150 may be similarly outfitted and may be realized on data processing resources of fleet management infrastructure 50. Any of the exemplary processor components of onboard processor 110 and offboard processor 150 may be implemented as, for example, microprocessors, graphics processors, artificial intelligence processors, volatile and/or nonvolatile memory components, programmable logic such as field programmable logic arrays (FPGAs) etc., that are sufficient for artificial intelligence, e.g., deep learning track detection, classification, localization and measurement of features identified by machine vision in the track images, such as those described below. Further, certain circuits may extend across the depicted processor components and be shared among processes executing thereon.

Exemplary imaging/image processor 112 may be constructed or otherwise configured to optically capture track characteristics from image field 25 and to electronically digitize, pixelate, format, etc., those track characteristics into image data that are sufficient for both machine vision and deep learning processing. Such image data is referred to herein as a track image although it is to be understood that more than tracks may be captured and contained in the image data. Imaging/image processor 112 may produce one or both of static images and full motion video at high resolution, e.g., at least 4K ultra-high definition (UHD; 3840×2160 pixels per frame). It should be inferred that the circuitry handling such high resolution data is present in the disclosed embodiments of the present inventive concept despite explicit details thereof being omitted from this disclosure. Skilled artisans will recognize various circuits that can be used in this regard without departing from the spirit and intended scope of the present inventive concept.

Feature detection processor 116 may be constructed or otherwise configured to perform various image processing tasks in furtherance of segregating objects of interest, e.g., track rails, track ties, track bed boundaries, and other railway components, from background elements and objects of lesser interest in image field 25. Railways are generally realized in regular, patterned structures having well defined edges. Accordingly, feature detection processor 116 may apply one or more filters that, for example, enhance pixel luminance of high gradient edges and/or subdue the pixel luminance of low gradient background regions. The present inventive concept may be practiced using various image filters that realize these results; however, it is to be understood that other feature detection/extraction techniques, including nonfilter implementations, pattern recognition, and the like.

Feature detection processor 116 may apply a curve fitting technique to the highlighted (e.g., luminance enhanced) attributes. Such a curve may enclose a region of pixels that corresponds in shape to a component of the track configuration under scrutiny. As used herein, the term "track configuration" is intended to refer to an assemblage of railway components that achieves a specific railway function, e.g., switches, crossovers, straight and curved runs, etc. Once feature detection processor 116 has computed such a curve, its characteristics may be provided to a requesting process along with a confidence measure or value that the computed curve fits the enhanced pixel data. Feature detection processor 116 may apply labels that have been selected in accordance with, for example, known component shapes and other known track configuration data, auxiliary data, e.g., satellite geopositioning data, and known geoposition of railway components. A confidence measure may be computed as to whether an attribute in a track image is indeed a feature of the railway. For example, the curve fitting process may find a set of polynomial curves that pass through a set of nodes, representatively illustrated at node 215, arranged along and/or over highlighted attributes. A least squares linear regression technique, for example, may be employed that, as part of its optimization processing, provides a confidence measure and/or uncertainty quantity as to how well the curve follows the highlighted pixel data and corresponding physical characteristic of the corresponding feature. The confidence value may be used to determine whether anomalies exist in the track image that should be investigated. For example, higher order terms in a proposed curve fit may indicate other than the regular shapes of a railway. Embodiments of the present inventive concept may determine whether the higher order curve is indeed part of the railway or indicates another anomaly that might be useful, such as for training. Applying a curve fitting technique through such attributes may result in the confidence level generated by the curve fitting method being lower than without the erroneously included attribute data, often substantially so. Unless the confidence measure meets a confidence threshold condition, e.g., greater than or equal to 85% confidence, the potential track defect may undergo additional analysis prior to a track defect alarm being issued to warn the rail vehicle operator. The present inventive concept is not limited to the manner in which confidence in a data fitting technique is computed so long as it has a scale on which confidence thresholds may be set as exemplified herein.

Onboard processor 110 may include a validation processor 118 by which it is determined whether attributes and/or features present in a track image are indeed a feature of a track configuration present in the track image. To do so, embodiments of the present inventive concept may realize an onboard DL model 119 that is constructed or otherwise configured to define a track configuration context against which attributes and/or features present in the track image are analyzed. For example, if an attribute is not within the track configuration context, it is identified as being outside the track configuration and therefore an anomaly. This aspect of embodiments of the present inventive concept is described further below.

False alarm mitigation processor 122 may be constructed or otherwise configured to determine whether the attribute in the track image captured from the railway is a feature of the railway captured in the track image. Unless it is determined that the attribute in the image is not a feature of a track configuration that conforms to a physical specification, e.g., the attribute remains unlabeled and the DL confidence measure meets an alarm confidence condition, false alarm mitigation processor 122 may exclude, suppress or make otherwise easily disregarded the issuance of the track defect alarm. Should the alarm confidence condition be met, false alarm mitigation processor 122 may issue the track defect alarm and may concurrently route the subject track image in which the attribute is presented to offboard processor 150 for additional processing.

DL model update processor 124 may be constructed or otherwise configured to populate DL track detection model 119 with model parameters, e.g., weights on network edges, obtained from offboard processor 150. DL track detection model 119 may be configured identically to offboard DL track detection model 157 executing on DL track detection processor 156. DL track detection model 119 may be trained remotely (i.e., offboard from the rail vehicle 11); instead, offboard DL track detection model 157 may be trained and the parameters (e.g., edge weights) achieved when DL track detection model 157 has met a cost function requirement are transferred to onboard DL track detection model 119 executing on DL track detection processor 118 through DL model update processor 124.

Similarly with onboard processor 110 described above, offboard processor 150 may be constructed or otherwise configured with computer readable instructions and/or electronic processing and memory circuitry to perform various functions, each depicted in FIG. 1 as a distinct processor component solely for purposes of explanation.

Data aggregation/image pooling component 154 may be constructed or otherwise configured to accept image and other data from rail vehicles 11 in fleet 15 and to assign each datum a storage location in memory. As is discussed further below, memory circuitry of offboard processor 150 may be partitioned into an onboard image pool storing unlabeled or partially labeled track image data for further processing and/or analysis and a labeled image pool storing labeled track image data that may be used for training DL track detection model 157 executing on DL track detection processor 156.

DL track detection, classification, localization and measurement processor 156, referred to herein simply as DL track detection processor 156, may be constructed or otherwise configured to accept pooled images and aggregated data and to cooperate with DL training processor 158 to train its underlying DL track detection model 157 with labeled track images provided by DL training processor 158. DL training processor 158 may be constructed or otherwise configured to select training images from a labeled image pool, modifying DL track detection model parameters, e.g., edge weights, based on an evaluation against a cost function, and terminating the modification of the DL track detection model parameters in response to convergence of the cost function (e.g., minimization, maximization) to a convergence threshold. The training image set may include images of track configurations that meet physical specifications and that have been previously encountered by fleet 15, captured in digital image(s) thereby and labeled to identify the captured railway features. If convergence of the cost function cannot be achieved to the convergence threshold, DL training processor 158 may provide the track image under scrutiny to image routing processor 162 for further dispensation. As with validation processor 118, input to offboard DL track detection processor 156 may be the track image under scrutiny and the output thereof may be, among other things, a track configuration context associated with a probability that attributes in the track image are railway features.

As indicated above, image routing processor 162 may be constructed or otherwise configured to route track images for associating labels with relevant image attributes thereby forming respective labeled features. For example, when offboard DL track detection processor 156 indicates a high confidence match with a known track configuration on which offboard DL track detection model 157 has been trained, image routing processor 162 may provide the subject track image and the labels associated therewith, to the extent that such have been generated for the attribute under scrutiny, to an auto-labeling process that generates labels and associates those labels with the attribute under scrutiny in the track image. This may be achieved by analyzing various cues in the context of the attribute in the track image and choosing a label with the highest likelihood of being correct. On the other hand, when offboard DL track detection processor 156 indicates a low confidence match with a known track configuration on which offboard DL track detection model 157 has been trained, image routing processor 162 may provide the subject track image and the labels associated therewith, to the extent that such have been generated for the attribute under scrutiny, to manual labeling routing process. Manual labeling routing may provide the track image under scrutiny and associated data to subject matter experts (SMEs) for manual labeling and storing the manually labeled track image to the labeled image pool where it can be used for DL model training.

Figure 2A:
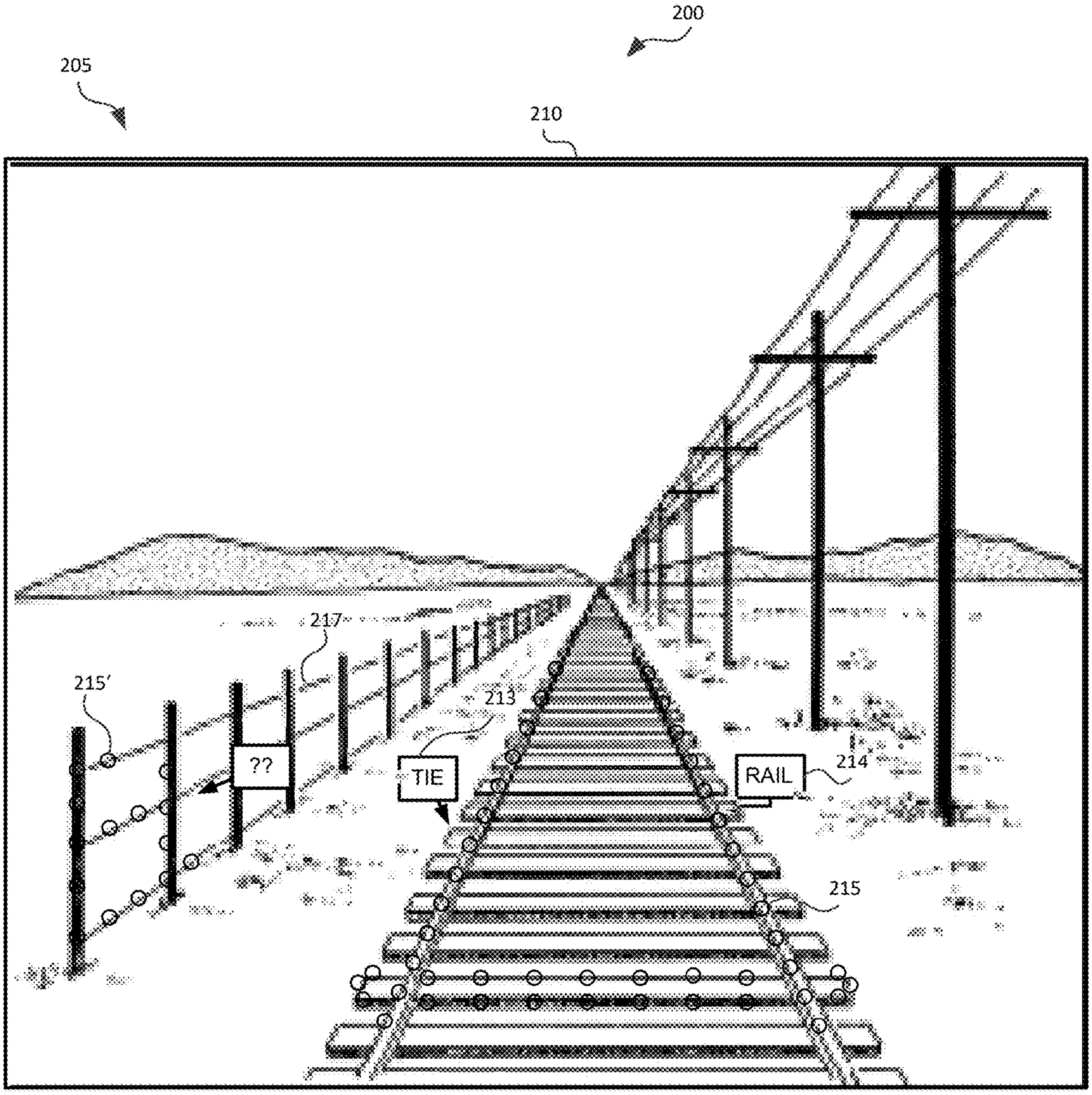
FIGS. 2A-2C are graphic representations of select operational states of an exemplary feature detection and false alarm mitigation process by which the present inventive concept can be embodied.
Figure 2B:
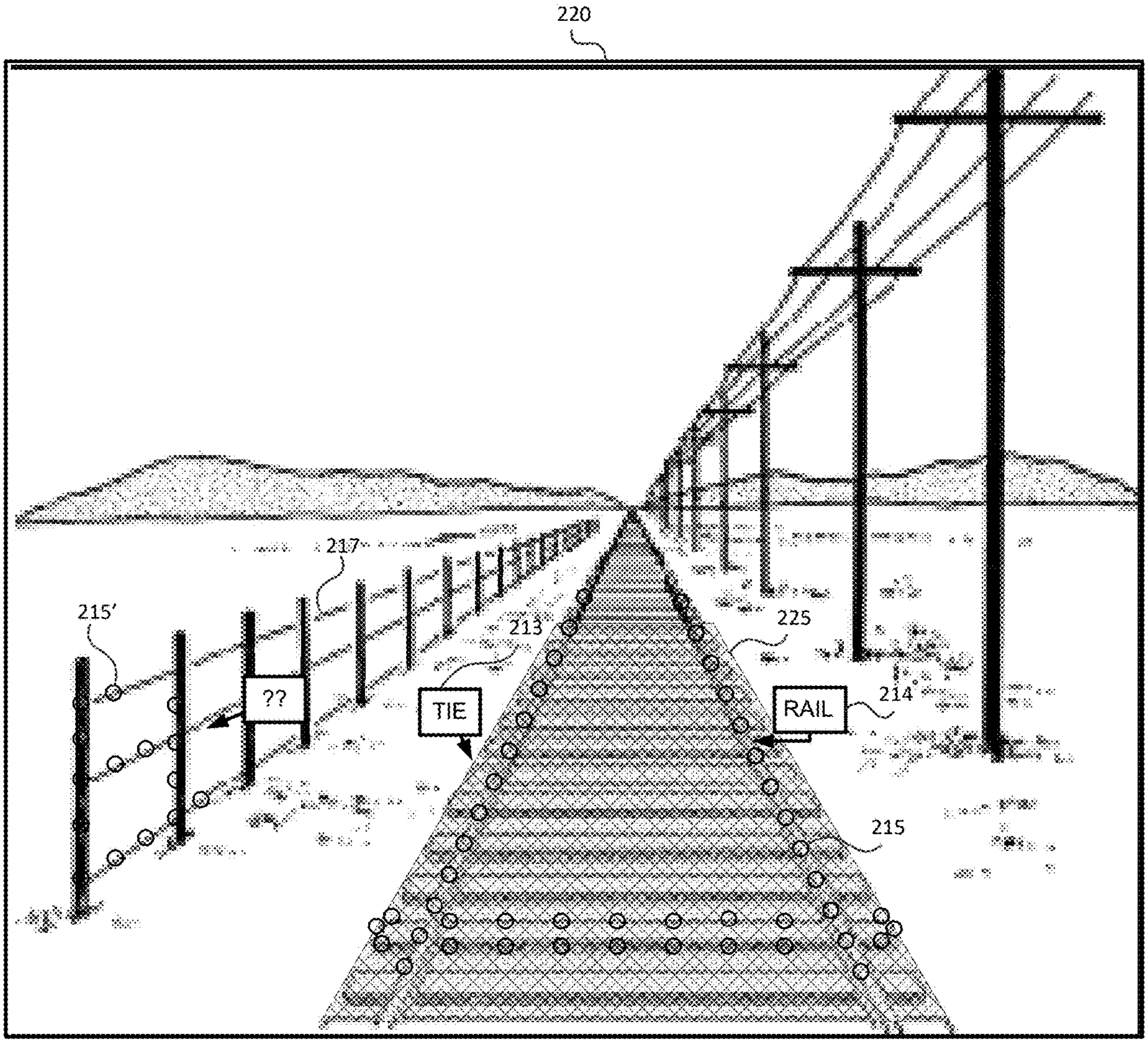
Figure 2C:
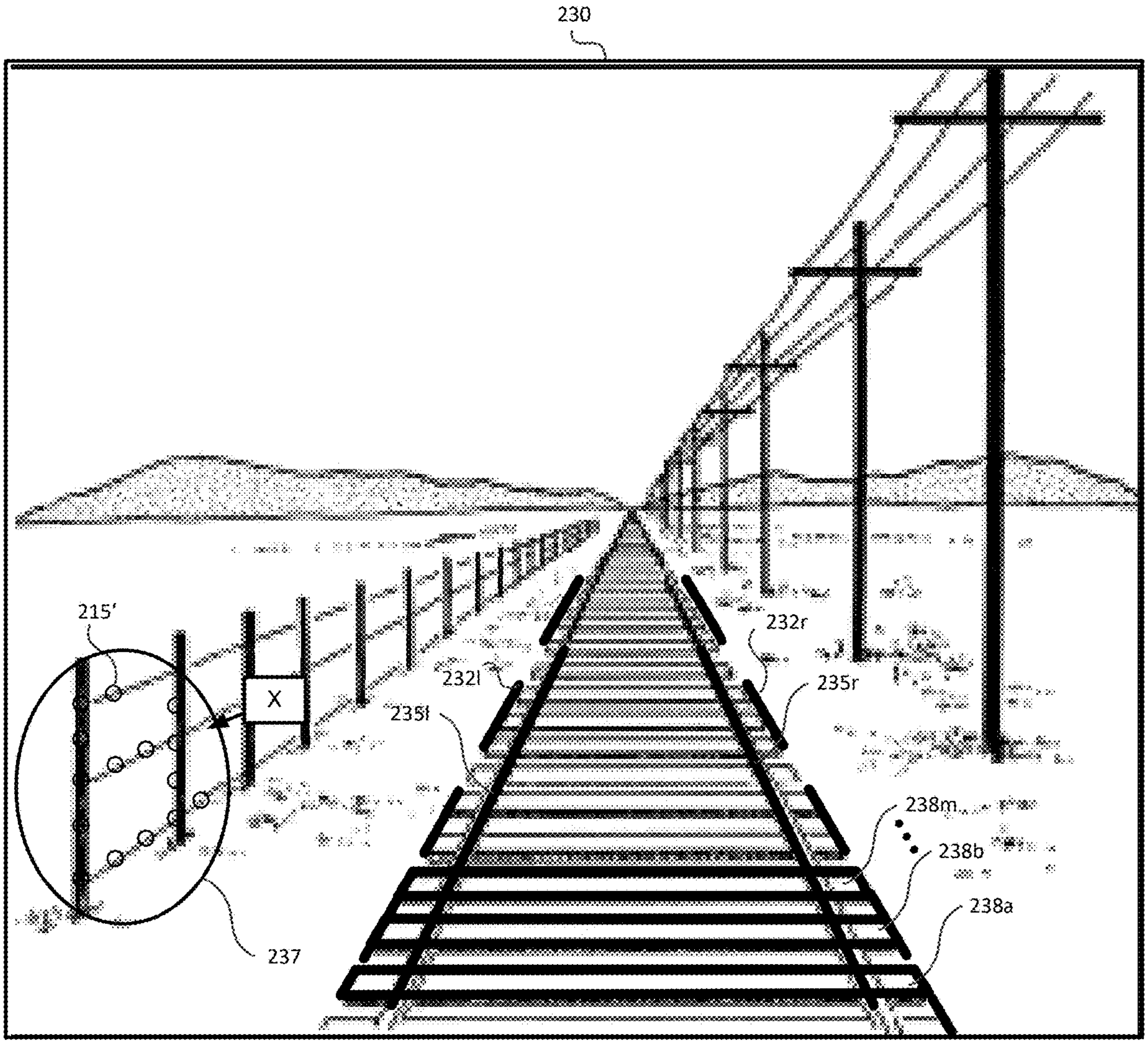

FIGS. 2A-2C, representatively referred to herein as FIG. 2, are graphic representations of select operational states 210-230 of an exemplary feature detection and false alarm mitigation process 200 performed on track image 205. Here, the term "operational state" is intended to refer to a point in the track defect false alarm mitigation processing after one operation has completed but before the temporally next operation starts. It is to be understood, however, that the inventive concept described herein is not limited to temporally sequential data processing.

At operational state 210, process 200 may have applied a gradient filter, such as an edge detection filter, to track image 205 as well as performed a curve fitting process on the detected edges. Computationally, the curve fit finds the best polynomial fit, for example, that passes through a set of nodes, representatively illustrated at node 215, arranged on the subject attribute. Certain embodiments may employ a least squares linear regression technique that provides a confidence measure and/or uncertainty quantity as part of its optimization processing. The attribute(s) may be highlighted through edge detection, for example, and may have labels associated with features that conform to the polynomial fit associated with the conditions under which track image 205 was taken. As is illustrated in the figure, in certain of those conditions, primary feature detection processor 116 may detect image attributes having high luminescent gradient, for example, that are not part of railway 20, such as portions of an adjacent fence 217. Moreover, feature detection processor 116 may attempt to apply curve fitting through such attributes, as representatively illustrated at node 215'. In doing so, higher order terms in the curve fit polynomial may be generated which may be indicative of an attribute that is not part of the railway.

As discussed above, feature detection processor 116 may identify certain track features from the manner in which the curve fits the attribute data. At operational state 210, the relative locations of nodes 215 and knowledge of track configurations may allow identification of rails, representatively illustrated at rail label 214, rail ties, representatively illustrated at tie label 213, among other railway components. Additionally, feature detection processor 116 may be unable to identify elements of fence 217 from attempting to curve fit through nodes 215 and nodes 215' concurrently. Consequently, the confidence measure computed through, for example, a least squares technique, may fail to meet a confidence threshold.

At operational state 220, onboard DL model 119 has been executed that may have been trained on track configurations that conform to product physical specifications to predict the track configuration that fits the input data, e.g., track image 205. As illustrated at operational state 220, onboard DL model 119 has predicted a track configuration context 225 in which ties 222, rails 224 and track bed 226 are contained. As illustrated in the figure, however, edge detected attributes corresponding to nodes 215' are not predicted by DL model 119 in that they fall outside the track configuration context 225 predicted by validation processor 118.

At operational state 230, a new feature search may have been performed with new search parameters that are confined to search within context 225. The result of the renewed search is nodes 215' in region 232 being excluded. That is, only those attributes that fall within the boundaries of track configuration context 225 are located in the search. When nodes 215' are excluded as a result of falling outside track configuration context 225, the confidence measure may increase to indicate that nodes labeled X in region 236 are not part of railway 20. It is to be noted that left and right bed boundaries 2341 and **234*r*, left and right rails 2351 and 235*r* and rail ties 238*a*-238*m*** have been isolated from attributes of less interest.

Figure 3:
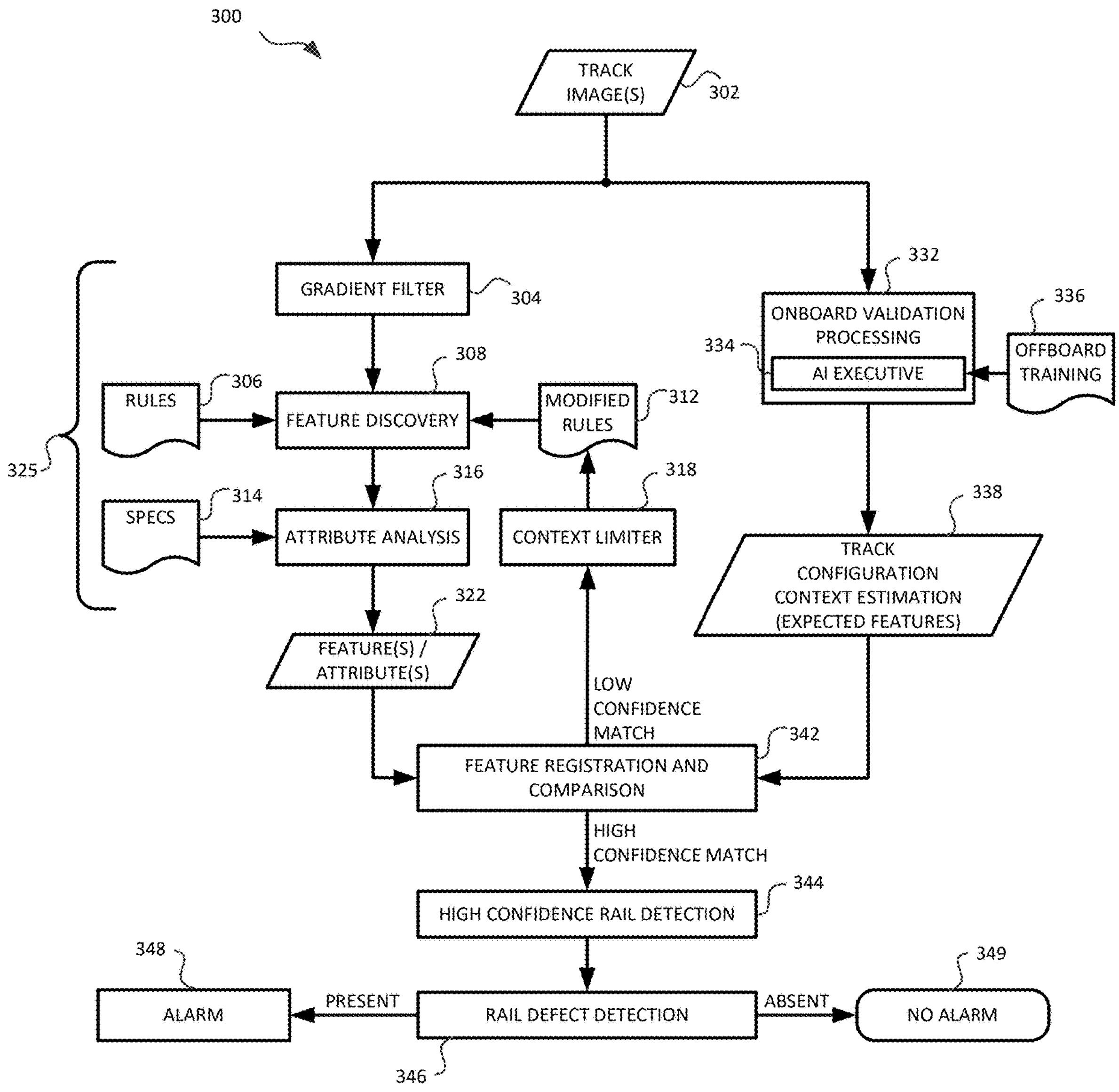
FIG. 3 is a schematic block diagram of an exemplary arbitration and false alarm mitigation processor by which the present inventive concept can be embodied.

FIG. 3 is a schematic block diagram of an exemplary track defect false alarm mitigation (TDFAM) apparatus 300 by which the present general inventive concept can be embodied. Whereas TDFAM apparatus 300 may receive offboard support, such as by way of offboard training 336, the functionality thereof may be constructed, programmed and/or otherwise configured to execute onboard each rail vehicle 11 autonomously. Skilled artisans will recognize well-known techniques by which such functionality may be achieved in view of the descriptions herein.

As depicted in the example, track images 302 may be provided to both onboard feature detection processing 325 and onboard validation processing 332. Onboard feature detection processing 325 may be configured as the primary feature detection technique while onboard validation processing 332 may generate a track configuration context that specifies the placement of components within a track configuration according to physical specifications thereof. Onboard validation processing 342 may be generated by, for example, an AI predictor or estimator, e.g., AI executive 334, executing a track configuration model. The example embodiments described herein implement DL as the AI paradigm, but such is not a requirement to practice the present inventive concept. Onboard feature detection processing 325 may be implemented using known computer vision techniques such as gradient filtering 304, feature discovery 304 on shapes highlighted by gradient filtering 304 and attribute analysis 316 that resolve features (labeled attributes) from attributes in the track image under scrutiny to generate feature(s) and attribute(s) data 322. Feature discovery processing 308 may search for graphical elements having track component shapes according to a set of search rules 306 prior to attribute analysis 316, which may compare those graphical elements against a specification 314 for determining whether an attribute meets physical dimensions for components of a track configuration. Together, gradient filter 304, feature discovery processing 308 and attribute analysis 316, illustrated at onboard feature detection processor 325, may be constructed or otherwise configured to generate features/attributes 322, where the features comprise attributes that have been labeled.

As illustrated in FIG. 3, features/attributes 322 and track configuration context estimation 338 may be provided to feature registration and comparison processing 342. Here, the term "registration" is used in its customary sense, i.e., a condition of correct alignment or proper relative position. In the present case, the registration may attempt to align the detected features with features predicted by onboard validation processing 332. The alignment allows a comparison that determines how well the data are registered, e.g., the detected features are within the predicted track configuration context. When there is high confidence that features/attributes 322 are aligned with track configuration context estimation 338, high confidence rail detection may be performed to isolate or highlight the rails of the railway. Rail defect detection 346 may be performed to determine whether an anomaly in the highlighted rails exists. If so, a track defect alarm 348 that might otherwise be activated is suppressed. When no anomaly exists, the aforementioned alarm may be issued to the rail vehicle operator. On the other hand, if there is low confidence as determined by feature registration and comparison processing 342, context limiter processing 318 may format modified rules 312 that may limit the search for track configuration features performed by feature discovery processing 308 to within the predicted track configuration context. The results of the new search may be passed feature discovery processing 308 and the process repeats with the modified search rules 312.

Figure 4:
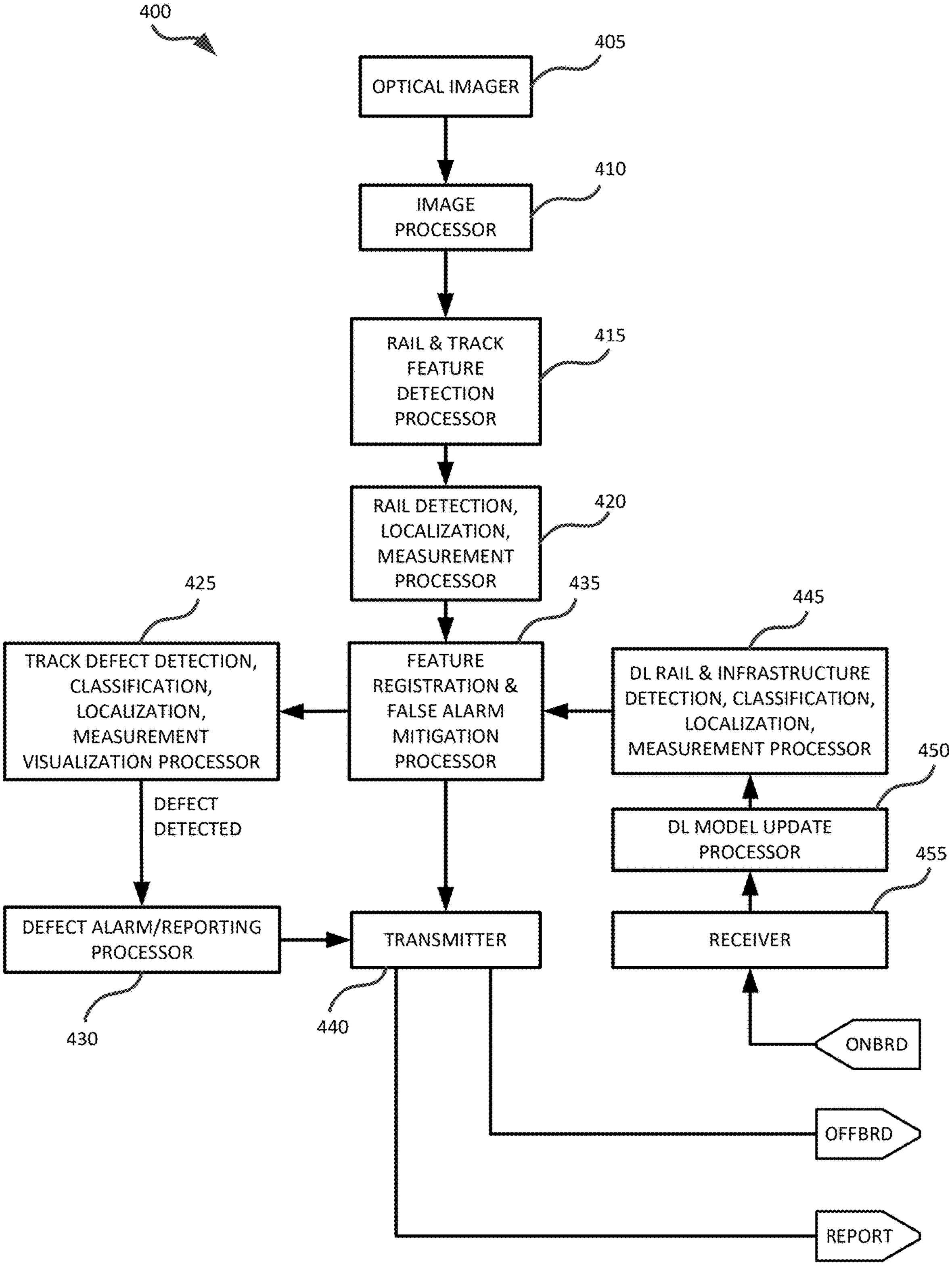
FIG. 4 is a schematic block diagram of an exemplary onboard track defect handling processor by which the present inventive concept can be embodied.

FIG. 4 is a schematic block diagram of an exemplary onboard track defect handling processor 400 by which the present inventive concept can be embodied. Onboard track defect handling processor 400 may implement much of the functionality described above with reference to onboard processor 110. An optical imager 405 may be constructed or otherwise configured to capture light and generate electrical signals appropriately and an image processor 410 that may be constructed or otherwise configured to assemble a track image from which features can be recognized by machine. Optical imager 405 and image processor 410 may be implemented as, for example, the UHD video camera described above with reference to imaging/image processor 112. Track images may be provided to rail and track feature detection processor 415, which may be constructed or otherwise configured to label image attributes as railway features that the attributes, once recognized, represent. Labeled track data may be provided to rail detection, localization and measurement processor 420 by which rails are isolated or otherwise highlighted in the track image. Detected rails and context data provided by a DL rail and infrastructure detection, classification, localization and measurement processor 445 may be registered one with the other to determine whether a track defect exists, as described herein, which may be performed by track defect detection, classification, localization, measurement and visualization processor 425. Such track defects, when detected, are reported and a track defect alarm may be issued through defect alarm/reporting processor 430. These data may be provided to transmitter 440 for conveyance to offboard processing resources depicted in FIG. 5.

As stated above, the DL model onboard rail vehicle(s) 11 may be a duplicate of a DL model offboard rail vehicle(s) 11 that has been trained thereat. Such model training performed offboard may be characterized by its edge weights, for example, which may be conveyed through receiver 455 to DL model update processor 450 communicatively coupled thereto. The onboard track configuration model may execute under DL rail and infrastructure detection, classification, localization and measurement processor 445.

Figure 5:
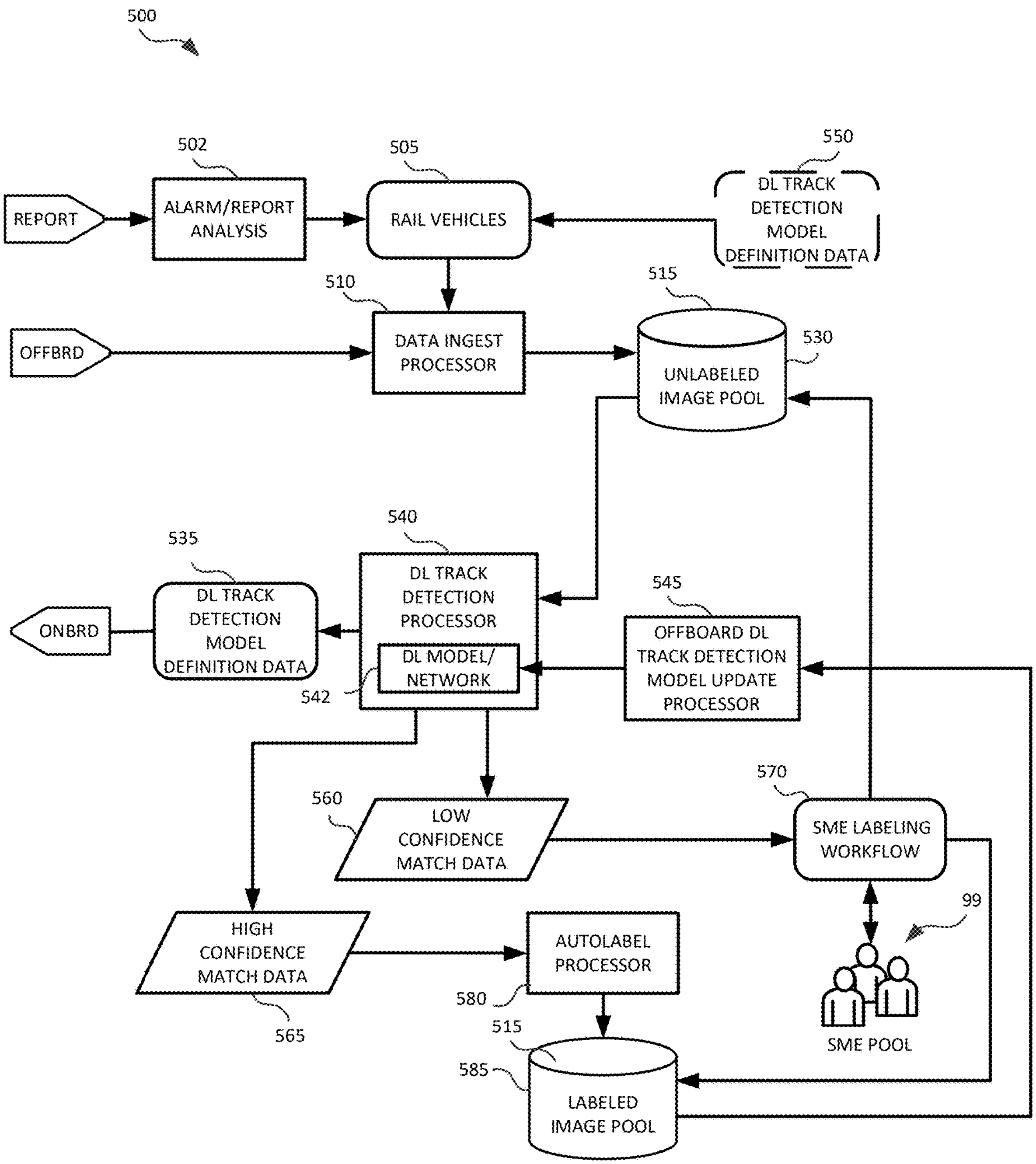
FIG. 5 is a schematic block diagram of an exemplary offboard processor by which the present inventive concept can be embodied.

FIG. 5 is a schematic block diagram of an exemplary offboard processor 500 by which the present inventive concept can be embodied. Offboard processor 500 may implement much of the functionality described above with reference to offboard processor 150. Track defect alarms are analyzed and provided to rail vehicles 505 as intelligence supporting feature detection and the like. A data ingest processor 510 may receive image, labeled features, classification, statistical, etc., data from the various rail vehicles 505 and store these data to memory circuitry 515 at onboard unlabeled image pool 530. Partially or completely unlabeled images stored in onboard image pool 525 may be provided to a subject matter expert labeling workflow 570 by which features are manually labeled and returned into image pool 530 as labeled track image data.

As illustrated in FIG. 5, labeled images may be retrieved from image pool 585 and provided to an offboard DL track detection model update processor 545 that updates DL model/network 542 executing on DL track detection processor 540. Once the DL network has been trained, DL track detection model definition data 550, e.g., edge weights, may be transferred to DL model update processor 450 through receiver 455. Certain federated learning techniques may be used to embody the present inventive concept in which a single model is trained, and the results distributed among entities, e.g., rail vehicles 11, at which the model is used for its regular intended purpose.

Once the model of DL track detection processor 545 has been trained, image data from image pool 525 may be provided thereto and analyzed. Where there is low confidence in a match between a feature and the track configuration context, the track image data 560 may be provided to SME labeling workflow 570 where images of interest are identified for manual labeling through a subject matter expert pool 99. In so doing, the volume of manual labeling work by subject matter experts is limited to special cases.

Upon DL track detection processor 545 determining that image label data associated image data matches the corresponding track configuration with high confidence, the high confidence image data 565 may be provided to an auto-label processor 580 by which known labels are associated with detected features. In certain embodiments, auto-labeled track image data is conveyed through SME labeling workflow 570 for verification. Track image data that has undergone manual labeling as well as the track image data that has undergone auto-labeling may be stored in labeled image pool 585 as labeled image data and used for DL model training with other such labeled data.

Figure 6:
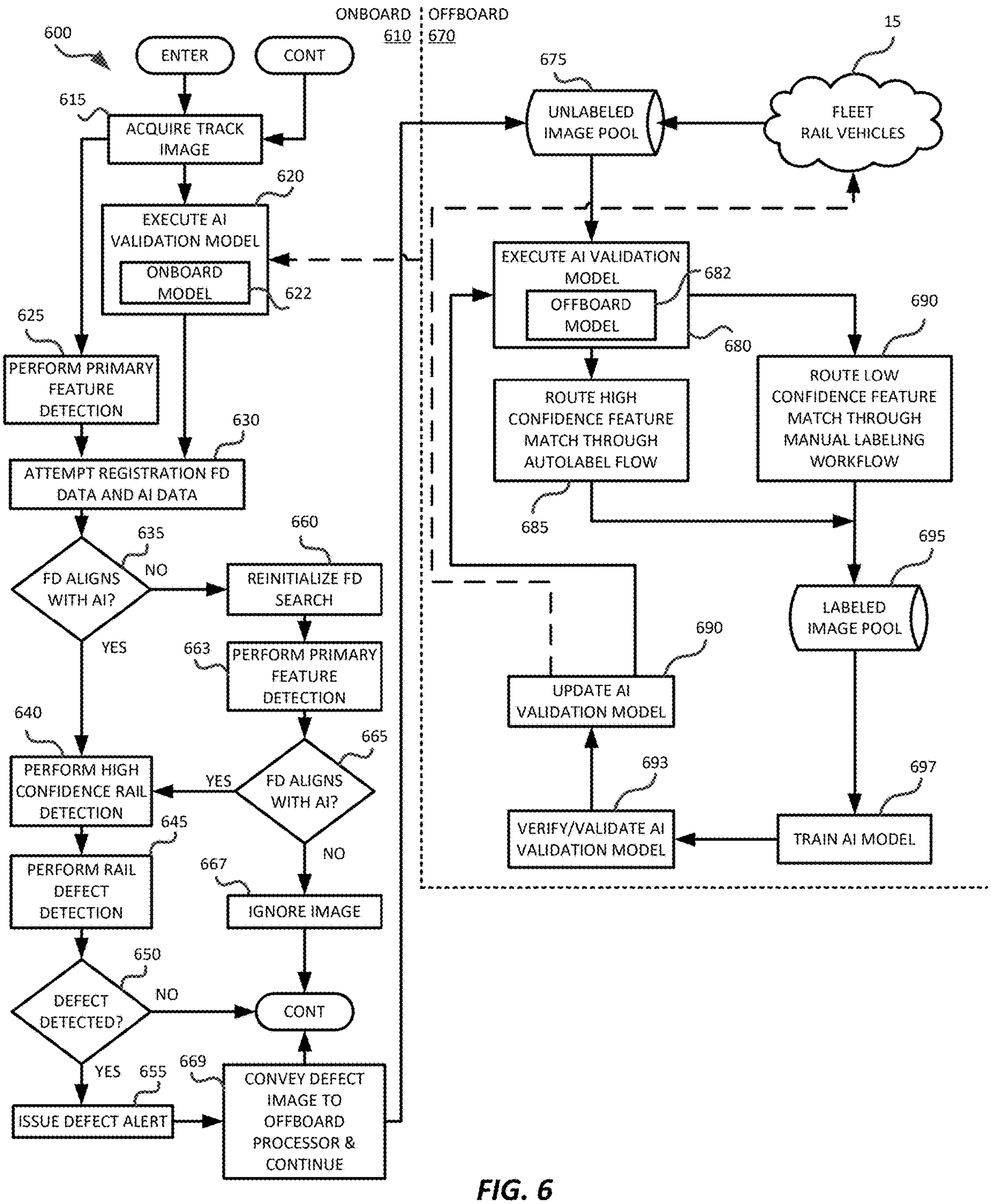
FIG. 6 is a flow diagram of an exemplary false alarm mitigation process by which the present inventive concept can be embodied.

FIG. 6 is a flow diagram of an exemplary false alarm mitigation process 600 by which the present inventive concept can be embodied. False alarm mitigation process 600 may be implemented as interoperating processes, e.g., an onboard process 610 and an offboard process 650. Exemplary onboard process 610 may be executed on onboard processor 110 to analyze track images for potential track defects and to mitigate, with the support of deep learning, the number of visual track inspections the machine operator must perform to verify that a given track defect alarm is not due to irrelevant image attributes and/or artifacts, i.e., false track defect alarms. Exemplary offboard process 650 may be executed on offboard processor 150 to label features in the track images that were not identified by onboard process 610 and to train the deep learning model using the labeled track images.

As is illustrated FIG. 6, track images may be acquired in operation 615, such as by an onboard camera. In operation 620, an AI validation model 622 may be executed on the track images and in operation 625, primary feature detection may be performed on the track images. In operation 630, an attempt is made to register feature detection data onto artificial intelligence track configuration data or, stated another way, by way of a successful registration attempt to a registration confidence level, pixels corresponding to the features detected in operation 625 fall within a track configuration context generated in operation 620. When registration is successful, as determined in operation 635, process 600 may transition to operation 640 by which high confidence rail detection is performed. Height confidence track configuration detection may highlight pixels corresponding to the rails of the railway. Process 600 may then transition to operation 645 by which rail defects are detected. This may be achieved on the highlighted rails by determining whether the highlighted pixels are arranged in accordance with railway specifications. If a defect is detected, as determined in operation 650, process 600 may transition to operation 655 by which a track defect alarm is issued to at least the rail vehicle's conductor. In operation 669, the track image is conveyed to the offboard processor and process 600 may continue at operation 615, by which a next track image is acquired.

If it is determined that feature detection data and artificial intelligence context data do not align, as determined in operation 635, process 600 may transition to operation 660, by which the feature detection search is reinitialized to search within the context bounds generated via onboard model 622. Such feature detection may be realized by operation 663. In operation 665, it is determined once again whether the feature detection data and artificial intelligence context data align. If so, process 600 may transition to operation 640 by which high confidence rail detection is once again performed, If the feature detection data and the artificial intelligence modeled data do not align, the image is ignored in operation 667 by which the track image under scrutiny is ignored and process 600 may transition back to operation 615 to analyze the next track image. Offboard process 670 may accept unlabeled (including partially labeled) track images from fleet rail vehicles 15 and store those track images in unlabeled image pool 675. In operation 680, an AI validation model, such as a DL model, may be executed, the results from which being processed in accordance with the confidence level in the solution: high confidence feature matches may be processed by an auto-labeling method in operation 685 and low confidence feature matches being routed through the manual labeling workflow in operation 690. In either case, the resulting labeled image may be stored in labeled image pool 695 to be used in model training in operation 697. The newly trained model may be validated in operation 693. The AI model, or the defining weights thereof, may be provided to update the onboard AI validation model 622 in operation 690 for all rail vehicles in fleet 15.

Certain embodiments of the present general inventive concept provide for the functional components to be manufactured, transported, marketed and/or sold as processor instructions encoded on computer-readable media. The present general inventive concept, when so embodied, can be practiced regardless of the processing platform on which the processor instructions are executed and regardless of the manner by which the processor instructions are encoded on the computer-readable medium.

It is to be understood that the computer-readable medium described above may be any non-transitory medium on which the instructions may be encoded and then subsequently retrieved, decoded and executed by a processor, including electrical, magnetic and optical storage devices. Examples of non-transitory computer-readable recording media include, but not limited to, read-only memory (ROM), random-access memory (RAM), and other electrical storage; CD-ROM, DVD, and other optical storage; and magnetic tape, floppy disks, hard disks and other magnetic storage. The processor instructions may be derived from algorithmic constructions in various programming languages that realize the present general inventive concept as exemplified by the embodiments described above.

INDUSTRIAL APPLICABILITY

In general, the teachings of the present disclosure may find applicability in railroad industries. More specifically, the teachings of the present disclosure may be applicable to railroad industries in which the railroad tracks may be at risk of buckling. The teachings of this patent apply to any type of rail transportation. Rail transportation is generally Passenger (Transit) and Freight.

Reducing user tedium and increasing confidence in computer executed decision-making tools are major objectives of a great number of industrial applications and various embodiments of the present inventive concept meet those objectives in track defect detection for track-faring safety. As discussed above in the BACKGROUND section, tending to every track defect alarm to segregate false positive defect detections therefrom can be a user intensive process that diverts the user's attention from tasks that might otherwise be performed. Additionally, increased confidence in track defect detection can be had by increasing confidence in computer-made decisions that false defect alarms are truly false alarms and can be ignored by the operator of a rail vehicle.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. A track defect false alarm mitigation apparatus for a rail vehicle that is conveyed on a railway, the track defect false alarm mitigation apparatus comprising:
- an imaging device constructed to capture a track image of the railway;
- a processor onboard the rail vehicle and constructed to:
  - perform feature detection on the track image to label an attribute in the track image as a feature of the railway captured in the track image;
  - generate a track configuration context by a track detection model, the track configuration context using artificial intelligence for predicting locations of track configuration components based on the track image;
  - attempt registration of the detected feature with the predicted track configuration context one with the other; and
  - issue an alert of a track defect except in response to the feature registering with the track configuration context to a confidence level.

2. The track defect false alarm mitigation apparatus of claim 1, wherein the processor is further constructed to:
- accept model parameters for the track detection model from another processor; and
- configure the track detection model with the accepted model parameters.

3. The track defect false alarm mitigation apparatus of claim 2, wherein the other processor is physically removed from and communicatively coupled to the processor onboard the rail vehicle, the other processor constructed to:
- train an offboard track detection model on pixels representing known track configurations to meet a cost threshold; and
- convey parameters of the trained offboard track detection model to the processor as the parameters of the track detection model accepted thereat.

4. The track defect false alarm mitigation apparatus of claim 3, wherein the other processor is further constructed to:
- route the track image that meets a high confidence threshold condition to an automated labeling component by which descriptive label data of a new component of the known track configurations are associated with the attribute exclusively of human intervention to form an automatically labeled track feature; and
- train the offboard track detection model with the track image that includes the automatically labeled track feature represented in the track image to meet the cost threshold.

5. The track defect false alarm mitigation apparatus of claim 3, wherein the other processor is further constructed to:
- route the track image that meets a low confidence threshold condition to a manual labeling workflow by which the descriptive data are associated with the attribute by human intervention to form a manually labeled track feature; and
- train the track detection model with the track image that includes the manually labeled track feature represented in the track image to meet the cost threshold.

6. The track defect false alarm mitigation apparatus of claim 1, wherein the processor is further constructed to modify search rules under which a search for features is performed.

7. The track defect false alarm mitigation apparatus of claim 6, wherein the processor is further constructed to repeat the feature detection on the track image using the modified search rules to label the attribute in the track image as the feature of the railway captured in the track image in response to the registration attempt failing to align the detected feature with the predicted track configuration context.

8. A railway enterprise system of rail vehicles that are conveyed on a railway comprising:
- an onboard processor onboard each of the rail vehicles, each being constructed to:
  - accept a track image captured from the railway by an imaging device;
  - accept model parameters for a track detection model from another processor;
  - perform feature detection on the track image to label an attribute in the track image being a feature of the railway captured in the track image;
  - generate a track configuration context by the onboard track detection model configured with the model parameters provided thereto, the track configuration context being generated by artificial intelligence for predicting locations of track configuration components based on the track image;
  - attempt registration of the detected feature with the predicted track configuration components based on the track image; and
  - issue an alert of a track defect except in response to the feature registering with the track configuration context to a confidence level; and
- an offboard processor physically removed from and communicatively coupled to the onboard processor, the offboard processor constructed to:
  - train the offboard track detection model on pixels representing track configurations to meet a cost threshold; and
  - convey parameters of the trained offboard track detection model to the onboard processor as the parameters of the track detection model accepted thereat.

9. The railway enterprise system of claim 8, wherein the offboard processor is further constructed to:
- route the track image that meets a high confidence threshold condition to an automated labeling component by which descriptive label data of a new component of the known track configurations are associated with the attribute exclusively of human intervention to form an automatically labeled track feature; and
- train the offboard track detection model with the track image that includes the automatically labeled track feature (SME) represented in the track image to meet the cost threshold.

10. The railway enterprise system of claim 9, wherein the offboard processor is further constructed to:

route the track image that meets a low confidence threshold condition to a manual labeling workflow by which the descriptive data are associated with the attribute by human intervention to form a manually labeled track feature; and train the offboard track detection model with the track image that includes the manually labeled track feature represented in the track image to meet the cost threshold.

11. The railway enterprise system of claim 8, wherein the onboard processor is constructed to modify search rules under which a search for features is performed.

12. The railway enterprise system of claim 11, wherein the onboard processor is further constructed to repeat the feature detection on the track image using the modified search rules to label the attribute in the track image as the feature of the railway captured in the track image in response to the registration attempt failing to align the detected feature with the predicted track configuration context.

13. The railway enterprise system of claim 8, wherein the onboard processor is further constructed to search for the feature of the railway captured in the track image by:

applying a computer-implemented edge detection filter to the track image that is constructed to enhance luminance of the attribute in the track image;

applying a computer-implemented curve fit to the enhanced luminance in the track image; and generating the confidence measure from conformance of the curve fit to a known track configuration.

14. A track defect false alarm mitigation method (600) for a rail vehicle that is conveyed on a railway, the track defect false alarm mitigation apparatus comprising:

performing, at a processor onboard the rail vehicle, feature detection on a track image captured from the railway to label an attribute therein as a feature of the railway captured therein;

generating a track configuration context by a track detection model configured with model parameters that predict by artificial intelligence locations of track configuration components based on the track image;

attempting registration of the feature with the predicted track configuration context one with the other; and issuing an alert of a track defect except in response to the feature registering with track configuration context to a confidence level.

15. The track defect false alarm mitigation method of claim 14, further comprising:

accepting, at the processor onboard the rail vehicle, the model parameters for the track detection model from another processor;

configure the track detection model with the accepted model parameters.

16. The track defect false alarm mitigation method of claim 15, further comprising:

training, by another processor physically removed from and communicatively coupled to the processor onboard the rail vehicle, an offboard track detection model on pixels representing known track configurations to meet a cost threshold;

convey parameters of the trained offboard track detection model to the processor as the parameters of the track detection model accepted thereat.

17. The track defect false alarm mitigation method of claim 16, further comprising:

routing the track image that meets a high confidence threshold condition to an automated labeling component by which descriptive label data of a new component of the known track configurations are associated with the attribute exclusively of human intervention to form an automatically labeled track feature; and training the offboard track detection model with the track image that includes the automatically labeled track feature represented in the track image to meet the cost threshold.

18. The track defect false alarm mitigation method of claim 17, further comprising:

routing the track image that meets a low confidence threshold condition to a manual labeling workflow by which the descriptive data are associated with the attribute by human intervention to form a manually labeled track feature; and training the track detection model with the track image that includes the manually labeled track feature represented in the track image to meet the cost threshold.

19. The track defect false alarm mitigation method of claim 18, further comprising:

modifying search rules under which a search for track features is performed by the processor.

20. The track defect false alarm mitigation method of claim 19, further comprising:

repeating the feature detection on the track image using the modified search rules to label the attribute in the track image as the feature of the railway captured in the track image in response to the registration attempt failing to align the feature with the predicted track configuration context.

* * * * *